United States Patent [19]
Spairani

[11] 3,855,798
[45] Dec. 24, 1974

[54] FLUID FLOW CONTROL DEVICE

[76] Inventor: Luciano Spairani, Via B Gigli No. 24, Bologna, Italy

[22] Filed: Mar. 22, 1973

[21] Appl. No.: 343,712

[52] U.S. Cl. .................................. 60/585, 60/591
[51] Int. Cl. ........................................... F15b 7/08
[58] Field of Search ........... 137/513.3, 525; 60/585, 60/586, 591

[56] References Cited
UNITED STATES PATENTS

| | | | |
|---|---|---|---|
| 2,910,093 | 10/1959 | Dahl | 137/525 |
| 3,043,404 | 7/1962 | Péras | 137/525 |
| 3,127,906 | 4/1964 | Balster | 137/525 |
| 3,269,409 | 8/1966 | Ansell | 137/525 |
| 3,580,273 | 5/1971 | Schwarz | 137/525 |
| 3,610,273 | 10/1971 | Russell | 137/513.3 |

*Primary Examiner*—Martin P. Schwadron
*Assistant Examiner*—Allen M. Ostrager
*Attorney, Agent, or Firm*—Ernest G. Montague; Karl F. Ross; Herbert Dubno

[57] ABSTRACT

A control device for the actuation of a hydraulic load, such as a disk brake, includes a cylinder with an outlet leading to the load, this outlet being separated from an adjoining cylinder chamber by a valve body provided with an elastically deformable peripheral skirt and with a capillary central passage. During the forward stroke of a piston acting upon an oil volume in the cylinder chamber under extraneous pressure, oil can flow around the valve body into the outlet to actuate the load. During the return stroke upon the release of the applied pressure, the deformable skirt blocks the peripheral path of the oil whereby the same can return to the cylinder chamber only through the capillary passage, at a reduced rate, the oil volume in the chamber being supplemented from an adjoining reservoir communicating therewith in the retracted piston position.

6 Claims, 1 Drawing Figure

PATENTED DEC 24 1974 3,855,798
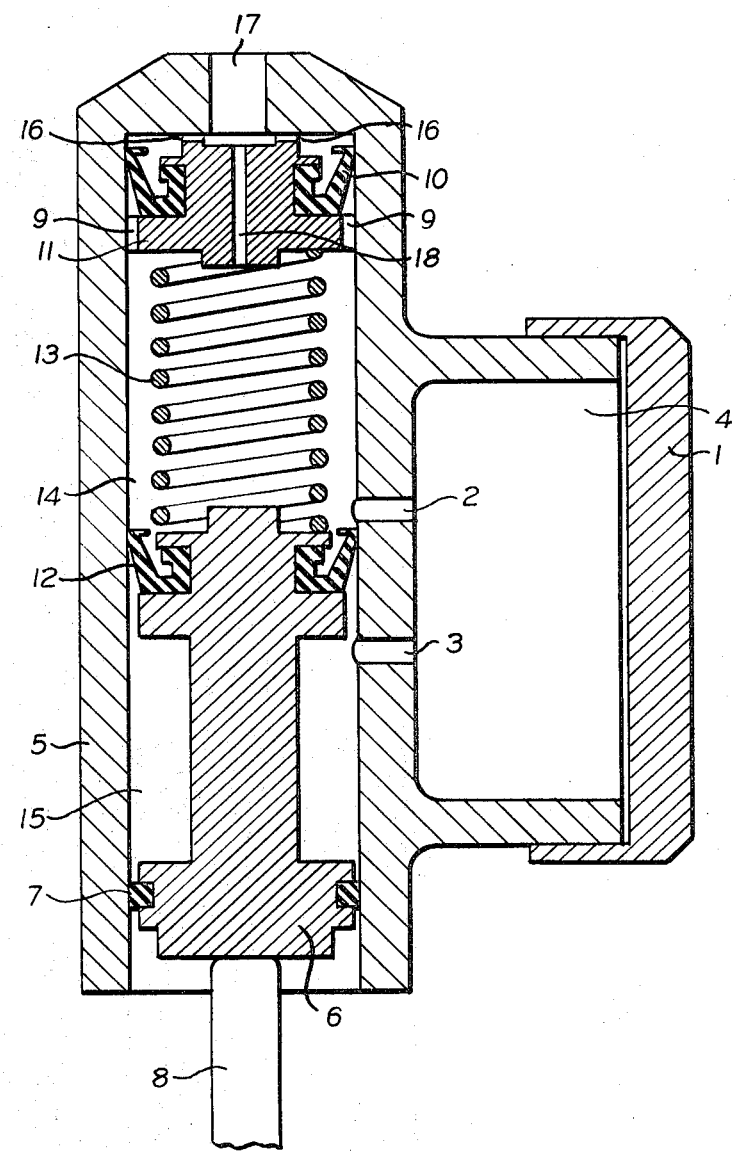

FLUID FLOW CONTROL DEVICE

The present invention relates to a hydraulic control device designed primarily for use with disk brakes of automobiles, airplanes and other motor vehicles.

Conventional control devices of the character described have a valve equipped with a restoring spring to regulate the return flow of the brake fluid. This spring eventually distends after prolonged use and causes malfunctions.

Consequently, the present invention has for its object to provide a control device of the character described wherein the need for such a spring-loaded valve is eliminated. I accomplish this by the provision of a cylinder from which, under the action of a pressure member, a hydraulic fluid such as oil is made to flow from a supply chamber toward the braking means through a valve body equipped with a peripheral gasket and provided with a central capillary fluid passage. When the action of the pressure member ceases, this gasket prevents any backflow of the oil along the peripheral surface of the valve body and forces the oil to flow exclusively through the capillary passage is returning to the supply chamber.

With this and other objects in view which will become apparent in the following detailed description, I shall now describe in detail the features of the present invention in connection with the accompanying drawing the sole FIGURE of which is an axial section of a representative embodiment.

The device embodying my invention can be used on any vehicle equipped with braking means and in particular with disk brakes. The device can be actuated manually, by foot, or with a servo-control mechanism.

The device shown in the drawing comprises a cylinder 5 supporting an oil reservoir 4 closed by a cover 1.

The reservoir 4 communicates via respective ports 2, 3 with two chamber 14 and 15 of cylinder 5, the oil filling the entire control device.

By the thrust of a lever 8 against the restoring force of a return spring 13, a piston 6 is made to move toward a valve body 11. With reservoir 4 partly empty at this stage, the restoring force of the oil in the chamber 14 flows through the opening 2 into the reservoir 4 until a gasket 12 of the piston obstructs the opening 2 whereupon the oil escapes through peripheral passages 9 in the rigid valve body 11 between the walls of the cylinder 5 and a gasket 10, in the outer face of valve body 11, to through passages 16 and an outlet leading to a load such as a disk brake. Fluid also reaches this capillary bore 18 in valve body 11.

Gaskets 10 and 12 here frustoconical peripheral skirts are deformable and act as one-way valves. Advantageously, these skirts are made of rubber or of resilient plastic such as "Teflon." They can assume, as shown, a generally J-shaped cross-section.

When the pressure on the operating lever 8 iy abruptly stopped, the coil spring 13 quickly returns the piston 6 to its original position. This sudden movement draws during the return stroke, a quantity of oil equal to the volume vacated by the piston 6 through the opening 17. Oil flowing into the chamber 14 passes solely through the capillary bore 18, for the gasket 10 expands under the oil pressure to form a fluidtight joint with the glider wall. This flow through the opening 18 eliminates the need for a spring-loaded check valve.

The capillary bore 18 does not pass enough oil to fill the chamber 14 immediately during this return stroke. Thus, the partial vacuum which tends to form in the chamber 14 aspirates oil from the chamber 15, which because of the decrease in pressure can flow between the walls of cylinder 5 and the yieldable gasket 12. Owing to its frustoconical shape diverging toward outlet 17, the gasket 12 can deform to allow passage of the oil in the direction of outlet 17.

It will be understood that the present invention is not limited to the embodiment shown and above described and that many modifications may be made therein without thereby departing from the scope of the appended claims.

What is claimed is:

1. A control device for the actuation of a hydraulic load, comprising:
   a cylinder provided with a supply chamber for a hydraulic fluid, said cylinder having an outlet leading to the load;
   a valve body in said cylinder separating said outlet from said chamber, said valve body being provided with a deformable peripheral gasket engaging the cylinder wall, said valve body further having a capillary passage giving access to said outlet from said chamber;
   a piston in said cylinder forming a movable boundary for said supply chamber, said piston being displaceable by an extraneous force toward said valve body whereby hydraulic fluid is forced from said chamber into said outlet partly by way of said capillary passage and partly around the periphery of said valve body, said gasket yielding to fluid pressure from said chamber to give passage to said fluid; and restoring means engaging said piston for returning same to an initial position remote from said valve body upon cessation of said extraneous force, thereby drawing fluid from said outlet back into said chamber by way of said capillary passage only, said gasket substantially preventing any return flow around the periphery of said valve body.

2. A control device as defined in claim 1 wherein said gasket forms a frustoconical skirt around said valve body diverging toward said outlet.

3. A control device as defined in claim 2 wherein said skirt has a generally J-shaped cross-section.

4. A control device as defined in claim 1 wherein said restoring means comprises a coil spring inserted between said valve body and said piston.

5. A control device as defined in claim 1, further comprising a fluid reservoir communicating with said chamber through a port in the cylinder wall, said port being blockable by said piston in an advanced position thereof.

6. A control device as defined in claim 5 wherein said piston is provided with a further peripheral gasket obstructing said port in said advanced position, said further gasket being sufficiently deformable to give passage to fluid from said reservoir during a return stroke of said piston.

* * * * *